(12) United States Patent
Domen et al.

(10) Patent No.: US 7,326,398 B2
(45) Date of Patent: Feb. 5, 2008

(54) NON-SILICA MESOPOROUS OXIDE HAVING IMPROVED PORE STRUCTURE PERIODISM, METHOD OF PRODUCING THE MESOPOROUS OXIDE AND METHOD OF CRYSTALLIZING PORE WALL OF NON-SILICA MESOPOROUS OXIDE USING TEMPLATE TO BE FILLED IN PORES

(75) Inventors: Kazunari Domen, Kanagawa (JP);
Junko Nomura, Kanagawa (JP);
Tokumitsu Kato, Kanagawa (JP)

(73) Assignee: Japan Science and Technology Agency, Saitama (JP)

( * ) Notice: Subject to any disclaimer, the term of this patent is extended or adjusted under 35 U.S.C. 154(b) by 236 days.

(21) Appl. No.: 10/504,429

(22) PCT Filed: Nov. 11, 2002

(86) PCT No.: PCT/JP02/11732

§ 371 (c)(1),
(2), (4) Date: Aug. 13, 2004

(87) PCT Pub. No.: WO03/074427

PCT Pub. Date: Sep. 12, 2003

(65) Prior Publication Data

US 2005/0084444 A1    Apr. 21, 2005

(30) Foreign Application Priority Data

Mar. 7, 2002 (JP) ............................. 2002-061591
Apr. 30, 2002 (JP) ............................. 2002-127961

(51) Int. Cl.
*C01F 7/00* (2006.01)
*C01G 1/00* (2006.01)
*C01G 33/00* (2006.01)
*C01G 35/00* (2006.01)

(52) U.S. Cl. ............................. 423/592.1; 423/594.17; 423/594.8; 423/625; 423/600; 423/594.16; 423/598; 423/610; 423/593.1; 423/263; 423/594.12; 423/608; 423/635; 423/641; 423/594.15

(58) Field of Classification Search ............ 423/594.17, 423/594.8, 625, 600, 594.16, 598, 610, 593.1, 423/263, 592.1, 594.12, 608, 635, 641, 594.15
See application file for complete search history.

(56) References Cited

U.S. PATENT DOCUMENTS

| | | | |
|---|---|---|---|
| 5,143,879 A * | 9/1992 | Whitehurst | 502/85 |
| 5,622,684 A * | 4/1997 | Pinnavaia et al. | 423/702 |
| 5,718,878 A * | 2/1998 | Zhang | 423/610 |
| 7,208,135 B2 * | 4/2007 | Sterzel | 423/593.1 |
| 7,211,238 B2 * | 5/2007 | Shan et al. | 423/625 |
| 7,223,377 B2 * | 5/2007 | Domen et al. | 423/592.1 |

OTHER PUBLICATIONS

David M. Antonelli et al. "Synthesis of a Stable Hexagonally Packed Mesoporous Niobium Oxide Molecular Sieve Through a Novel Ligand-Assisted Templating Mechanism" Angew. Chem. Int. Ed. Eng. (Mar. 1996) 35, No. 4, pp. 426-430.*

* cited by examiner

Primary Examiner—Timothy C. Vanoy
(74) Attorney, Agent, or Firm—Roger C. Hahn; Hahn & Voight PLLC

(57) ABSTRACT

A method for preparation for mesoporous oxide comprising a non silica oxide having a hexagonal pore structure periodicity and an average maximum pore length of from 2 nm to 5 nm, characterized by comprising blending 0.003 mol to 0.01 mol of $TaCl_5$, $NbCl_5$ or a mixture thereof and Al isopropoxide comprising 10 g of an aliphatic linear alcohol and 1 g of a template compound to prepare a mixture for forming a sol solution, adding 5 mol to 35 mol (based on the metal compounds) of water or an aqueous inorganic acid solution to the mixture followed by hydrolysis and polycondensation to give a sol solution, transferring the sol into an oxygen containing atmosphere followed by again at 40° C. to 100° C. to form a gel, and then calcinating the gel in an oxygen containing atmosphere at 350° C. to 550° C.; and the mesoporous oxide obtained by the method.

10 Claims, 8 Drawing Sheets

NON-SILICA MESOPOROUS OXIDE HAVING IMPROVED PORE STRUCTURE PERIODISM, METHOD OF PRODUCING THE MESOPOROUS OXIDE AND METHOD OF CRYSTALLIZING PORE WALL OF NON-SILICA MESOPOROUS OXIDE USING TEMPLATE TO BE FILLED IN PORES

FIELD OF THE INVENTION

The present invention relates to non-silica mesoporous oxide characterized by specific feature such as structure and periodicity of mesopore, that is, the structural feature that hexagonal cylindrical mesopore is arranged with uniform periodicity, and also relates to the method for producing of said non-silica mesoporous oxide by controlling the structure of the fine pore and periodicity, further relates the method for forming the mesoporous oxide having pore wall whose crystallizing ability of pore wall is improved maintaining the pore shape and structure of mesoporous oxide.

In the present invention, the term of precursor of mesoporous oxide means the mesoporous oxide composed of amorphous or non-crystalline pore wall.

DESCRIPTION OF THE PRIOR ART

Recently, the various kinds of mesoporous substances having crystalline structure of nano scale of 2 nm-50 nm have been synthesized. One of the methods utilized in the synthesis of porous inorganic material having said structure is the sol-gel method wherein a precursor of mesoporous oxide forming inorganic material and a template formed by surfactant added to said synthesis system as additives forming micelle-aggregats served as the template are used. And the porous material synthesized above is expected to be used as the material which has various functions such as catalyst. Further, the porous material with nano structural fine pores synthesized above is paid attention in various fields, because it generates quantum effect.

However, since the non-silica mesoporous, oxide which is synthesized by conventional method, has substantially amorphous pore wall, the structural stability is not so good and the fields to be applied is restricted. In said circumstance, the inventors of the present invention continued the development of the art which removes above mentioned problem, that is, to make the mesoporous material with crystalline pore wall. And the inventors of the present invention have accomplished the synthesis of mesoporous transition metal oxide having meso pores with pore wall in which single crystal is grown, especially, crystalline structure of mesoporous metal oxide is developed in whole primary particles, specifically crystalline mesoporous NbTa oxide (Japanese Patent Application 2000-175306: Dec. 6, 2000, Ceramics, 36(2001) No. 12, p913-916).

However, the paper which reports the synthesis of non-silica mesoporous oxide in which the structure of fine pores, uniformity of its structure and uniformity of periodicity of said pores structure are controlled at the same time is not yet. The reason why can be explained as follows. That is, even if the method for synthesis of mesoporous silica such as MCM-41 or SBA-15 with high fine pore structural periodicity is simply applied to the synthesis of non-silica material, it is almost impossible to synthesize the non-silica mesoporous oxide having uniform pore size and wall thickness and maintaining ordered array structure of fine pores for long span. Usually, as the metal source to form mesoporous metal oxide, metal alkoxide has been used. However, recently, the following methods for synthesis of various mesoporous metal oxides are reported. That is, by so called sol-gel method, for example, alcohol solution of metal chlorides and nonionic surfactant (product name; P123, product of BASF or P85, product of Asahi Denka Industries) is prepared so as to form metal alkoxide at this preparation process, then the formed metal alkoxide is hydrolyzed and polycondensed. However, this report is only reporting the method for preparation of non-silica mesoporous oxide by using alcohol as a solvent and by adding 0.010 mol of metal source under the condition of not existing of water, and does not discuss about the relationship between water and/or blending amount of metal source and feature of array structure of fine pores generated mesoporous material.

In sol-gel method, water is necessary for hydrolysis. However, in general, it is difficult to obtain high periodicity of fine pore structure under the presence of excess water. Further, there is no paper reporting that in the process of hydrolysis and next polycondensation reaction, high periodicity of fine pore structure is obtained under the presence of acid or base which can be a catalyst. Considering the gelatification speed and the interaction of micelles or rods themselves which are served as a template of fine pore structure, the blending amount of water or metal oxide precursor is the factor which largely effects on the obtained mesoporous structure. Therefore, the inventors of the present invention thought that the mesoporous material whose periodicity of mesoporous structure and/or fine pore structure improved can be obtained by changing the blending amount of water and/or metal chloride.

Further, there is a problem that the crystallinity of pore wall of the mesoporous material obtained by the conventional method is not sufficient, and when the high temperature crystalline treatment to improve the crystal angle is carried out, the fine pores are broken and periodic structure of fine pores is got out. For example, in the case when heat treatment is carried out to obtain a mesoporous material with atom scale crystallinity, there is a problem that to maintain the fine pore and periodicity of fine pores before crystallization is difficult. In such circumstances, because the fine pore structure of mesoporous substance is effected from the environment at the synthesis, the inventors of the present invention started the development of the technique for synthesis of transition metal oxide having uniform pore size and periodic pore structure, for example NbTa oxide, and investigated and succeeded the establishment of the method for synthesis of mesoporous substance which satisfy the fine pore structure and equality of it and the uniformity of the periodicity of said fine pore structure at the same time (refer to Japanese Patent Application No. 2000-61591, filed on Mar. 7, 2002). However, the pore wall of the mesoporous substance obtained by said improved method has a problem that the maintaining of the fine pores, fine pore structure and uniformity of them is difficult.

Therefore, the first subject of the present invention is to provide non-silica mesoporous oxide whose fine pore structure and/or periodicity of fine pores are improved and to provide the method for preparation of the non-silica mesoporous oxide whose fine pore structure and/or fine pores periodicity are improved.

The second subject of the present invention is to provide the method to improve the crystallinity of pore wall which can maintain the fine pore structure present before heat treatment, and fine pore structure and uniformity of it after heat treatment for crystallization.

For the purpose to accomplish the first subject, the inventors of the present invention carried out following experiments based on the presumption that the mesoporous oxide whose periodicity and/or fine pore structure is improved can be synthesized by changing the blending ratio of water and/or metal chloride or isopropoxide to 1 mole of surfactant or to change the blending magnification (ratio) of water to 1 mole of metal chloride or isopropoxide. That is, many trial and error experiments by changing said blending amount were carried out, and from these experimental results, the inventors of the present invention have found out that, in niobium, tantalum and complex of these element and aluminum non-silica mesoporous oxide, the fine pore structure itself and uniformity of periodicity of fine pore structure can be improved, and accomplished the first subject of the present invention. The discovery that the feature of mesoporous substance can be improved by controlling the adding amount of water is an unexpected effect.

Further, for the purpose to accomplish the second subject of the present invention, the inventors of the present invention have investigated the means to maintain the fine pores, fine pore structure and uniformity of the precursor of mesoporous substance. During these investigations, the inventors of the present invention have thought to use the fine pore filling material (hereinafter, can be said as filling template) which can filled in said fine pores, having heat resistance which can maintain the shape during crystallizing heat treatment of pore wall and is removable from said fine pores after said crystallization heat treatment, and tried various trial error experiments to find out the substance which is effective as the filling template. The inventors of the present invention have found that the partially or fully carbonized filling template with heat resistance can be formed in fine pores by filling organic compound which can be partially or fully carbonized by carbonizing treatment then by carbonized, and found that the filling template can be formed by mixing the precursor of said mesoporous substance with tertraethylorthosilicate (TEOS) or sodium silicate solution at room temperature and filling said obtained solution in fine pores then gelled at 80° C.-100° C., further found that the filling template composed of $BaCl_2$ or NaCl can be formed by mixing the precursor of said mesoporous substance with saturated aqueous solution of $BaCl_2$ or NaCl at room temperature and filling it in fine pores then by evaporated off and dried up at 80° C.-100° C. The inventors of the present invention have found that the mesoporous substance whose crystallinity of fine pore wall is improved can be obtained by forming a filling template in the precursor of mesoporous substance by above mentioned means to form filling template, carrying out crystallization heat treatment, then, by removing said filling template by burning in the case when the filling template is the partially or fully carbonized filling template or by removing by washing with acid or alkaline solution or water in the case of other template, thus the second subject of the present invention is accomplished.

SUMMARY OF THE INVENTION

The first invention of the first subject of the present invention is the mesoporous oxide, wherein fine pore structure is hexagonal packed structure, average maximum length of fine pores is from 2 nm to 50 nm and the wall which forms said fine pores is composed of non-silica oxide selected from the group consisting of Ta oxide, Nb oxide, mixed oxide of Ta and Nb and Al oxide. Desirably, the first invention of the first subject of the present invention is the mesoporous oxide, wherein the hexagonal packed structure of fine pore structure periodicity is observed by the observation of an electron diffraction pattern in which 6 spots are observed by even intervals on vertical direction to the fine pores. More desirably, the first invention of the first subject of the present invention is the mesoporous metal oxides, wherein the nitrogen adsorption isotherm curve steeply ascends at $P/Po=0.5-0.65$ around and becomes flat at over than $P/Po=0.55-0.8$ around.

The second invention of the first subject of the present invention is the method for preparation of mesoporous oxide composed of non-silica mesoporous oxide comprising, preparing mixture for forming sol solution by blending 0.003 mol-0.01 mol of $TaCl_5$, $NbCl_5$, mixture of these compounds or Al isopropoxide to the solution composed of 10 g of aliphatic normal alcohol and 1 g of template compound, adding 60 g-160 g of water to said mixture hydrolysing and polycondensing so as to form sol solution, transporting said sol to the environment where oxygen is existing, forming gel by maturing with one or plural steps at 40° C.-100° C. and calcinating said sol in the environment where oxygen is existing at 350° C.-550° C. Desirably, the second invention of the first subject of the present invention is the method for preparation of mesoporous oxide, wherein said template material is nonionic surfactant consisting of block copolymer composed of polyethyleneoxide chain $(CH_2CH_2O)_m$ and polypropyleneoxide chain $[CH_2CH(CH_3)O]_n$ (wherein, m and n is 10-70, end of said polymer is etherificated by H, alcohol or phenol), wherein, alcohol is methanol, butanol, propanol, hexanol or mixture of 2 or more of these alcohols.

Further, the invention of the second subject of the present invention is the method for preparation of mesoporous oxide whose crystallinity is improved comprising, forming a filling template at least in fine pores of precursor of the mesoporous oxide, wherein said filling template can maintain the shape of it during the crystallization heat treatment process of the fine pore wall and said filling template can be removed by water or water to which acid or base is added, carrying out the crystallization heat treatment in the presence of said filling template, then removing said template by calcinating or by washing with water or water to which acid or base is added. Desirably, the invention of the second subject of the present invention is the method for preparation of mesoporous oxide whose crystallinity is improved, wherein the method to form the filling template at least in fine pores of precursor of the mesoporous oxide contains the process to form organic compound which can be partially or fully carbonized by carbonizing treatment and to form a filling template consisting of partially or fully carbonized substance by calcinating said organic compound or the process to form a filling template by filling partially or fully carbonized substance into said fine pores. More desirably, the invention of the second subject of the present invention is the method for preparation of mesoporous oxide whose crystallinity is improved, wherein the organic compound which can be partially or fully carbonized by carbonization is polymer of furfuryl alcohol, glucose, fructose or derivatives thereof, the compound to be carbonized used in forming process of the filling template by filling partially or fully carbonized substance into said fine pores by carbonization is hydrocarbon, and carbonization treatment is heat decomposition treatment and/or dehydration decomposition treatment by conc. sulfuric acid, further desirably, the invention of the second subject of the present invention is the method for preparation of mesoporous oxide whose crystallinity is improved, wherein the precursor of mesoporous oxide is obtained by adding and dissolving salt and/or metal alkoxide of transition metal which is the precursor of transition metal oxide into the solution prepared by dissolving polymer detergent in organic solvent, making said salt and/or metal alkoxide of transition metal hydrolyze and polymerize so as to form self-organized sol solution, obtaining stabilized gel from said sol solution and calcinating said gel in the atmosphere where oxygen is existing at 350° C.-550° C., crystallizing heat treatment is carried out by higher temperature than said calcination temperature under inert atmosphere where oxygen is not existing.

Further, the invention of the second subject of the present invention is the method for preparation of mesoporous oxide whose crystallinity is improved, wherein the method to form the filling template at least in fine pores of precursor of the mesoporous oxide contains the process to mix said precursor with tetraethylorthosilicate (TEOS) or sodium silicate solution at room temperature and to gelatinize tetraethylorthosilicate (TEOS) or sodium silicate solution at 80° C.-100° C. after filled in fine pores, or contains the process to mix said precursor with saturated aqueous solution of $BaCl_2$ or NaCl at room temperature, filling saturated aqueous solution of $BaCl_2$ or NaCl into fine pores and carrying out evaporation to dryness at 80° C.-100° C., so as to form filling template of $BaCl_2$ or NaCl in fine pores.

More desirably, the invention of the second subject of the present invention is the method for preparation of mesoporous oxide whose crystallinity is improved, wherein the precursor of mesoporous oxide is obtained by adding and dissolving salt and/or metal alkoxide of transition metal which is the precursor of transition metal oxide into the solution prepared by dissolving polymer detergent in organic solvent, making said salt and/or metal alkoxide of transition metal hydrolyze and polymerize so as to form self-organized sol solution, obtaining stabilized gel from said sol solution and calcinating said gel in the atmosphere where oxygen is existing at 350° C.-550° C., crystallizing heat treatment is carried out by higher temperature than said calcination temperature under existence of oxygen.

DESCRIPTION OF THE PREFERRED EMBODIMENT

The present invention will be illustrated more in detail.

A. As the surfactant which is used to form nano size fine pores in the invention of the first subject, the surfactant used in the documents mentioned above can be used. Namely, oligomer (including polymer) of ethylene glycol, polyalkyleneoxide block copolymer composed of propyleneglycol oligomer (including polymer) and the compound characterizing the end of said block copolymer is etherficated by alcohol or phenol can be used. These compounds are desirable surfactant from the view point of harmless. However, besides the compounds mentioned above, the compounds used as the template compound which forms nano size fine pores can be used.

In the invention of the first subject of the present invention, the blending ratio of said surfactant and metal salt and alkoxide, which forms said metal oxide, is the important factor to control the shape of fine pore, periodic array structure which relates with blending amount of water.

By the results from many trial and error experiments, it is understood that the blending amount of metal salt and alkoxide of 0.003 mol-0.01 mol to 1 g of the surfactant is desirable for the preparation of aimed mesoporous oxide composed of non-silica oxide selected from the group consisting of Ta, Nb or mixed oxide of them and Al oxide whose average maximum length of fine pores is 2 nm-50 nm and whose fine pore structural periodicity is hexagonal sequence structure.

B. Since the blending ratio of metal source to the surfactant is controlled in above mentioned item A, the blending of 5-35 times mol of water to the compound which is a metal supplying source is equally can be said that the blending ratio of water to said detergent is indirectly controlled.

According to the results obtained by trial and error experiments which were carried out by changing the blending amount of water and/or metal supplying compound variously, the formation of sol solution by hydrolysis and polycondensation by adding 5-35 times of mol factor (Y axes in FIG. 1) is desirable for the preparation of aimed mesoporous non-silica oxide selected from the group consisting of Ta, Nb or mixed oxide of them and Al oxide whose average maximum length of fine pores is from 2 nm to 50 nm and whose fine pore structural periodicity is hexagonal packed structure.

Figure 1:
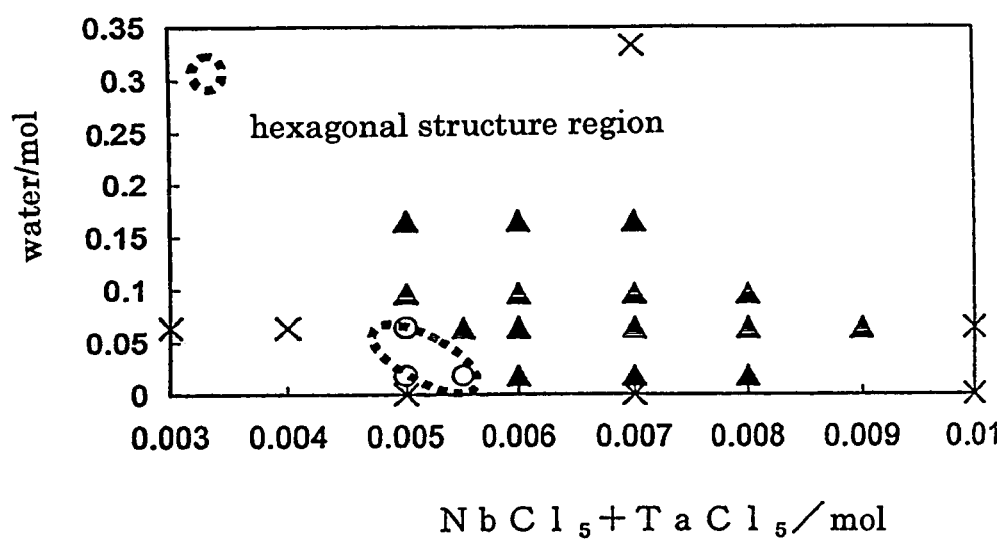
FIG. 1 shows the relationship between fine pore size of mesoporous NbTa complex oxide which generates when the blending amount (mol) of water (ordinate) to be added and metal source (equilli-molar mixture of $NbCl_5$ and $TaCl_5$ is used) to 1 g of detergent at the preparation of oxide at sol-gel method is changed and fine pore structure period characteristic. Especially, limited condition in the ranges exampled by a dotted circle.

FIG. 1 relates to the method to prepare NbTa mixed oxide, and shows the condition of blending amount to form mesoporous oxide having desired fine pore size and fine pore structure of hexagonal cylindrical mesopore structure when the blending amount (mol) of water (ordinate) to be added to sol formation series at the preparation of oxide by sol-gel method and the blending amount (mol) of metal supplying source (equimolar mixture of $NbCl_5$ and $TaCl_5$ is used) to 1 g of detergent. Although it is in very limited condition (in the range examplied by dot at the top of the drawing in FIG. 1), it becomes clear that the aimed mesoporous oxide can be obtained.

C. Sol solution formed by the method mentioned above forms gel by maturating the sol solution by one or more steps for 3-7 days after transporting it to the atmosphere in which oxygen exists, for example, to air, at the temperature of 40° C.-100° C. Said maturating process has significant meaning for growing gel which forms desired mesoporous metal oxide by micelle formation by surfactant serve as template in maturation.

By calcinating the gel grown as above at 350° C.-550° C., the surfactant, which is the material for template, is removed and the mesoporous oxide, which is the object of the present invention, can be obtained.

Figure 7:
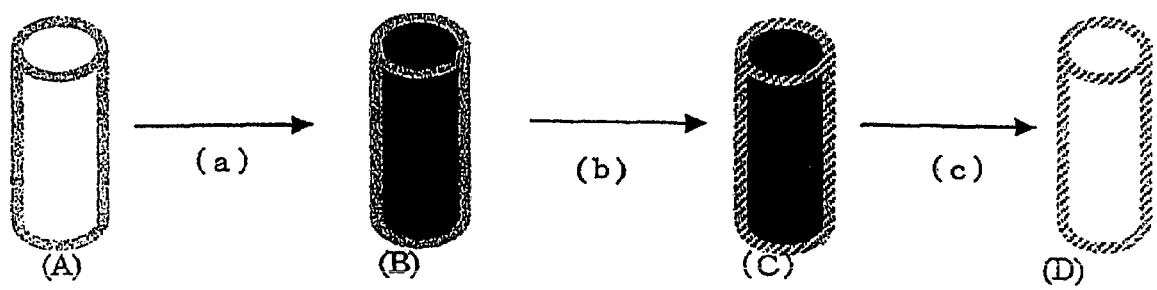
FIG. 7 is the scheme showing that the crystallinity of amorphous fine pore wall is improved by using the template composed of carbon material of one embodiment of the invention of said second subject of the present invention. (A) is amorphous fine pore wall, (B) is the state showing that carbon source is introduced into fine pores, (C) is the state showing that amorphous fine pore wall in which carbon is filled is crystallized by heat treatment and (D) is the state showing that the carbon source is removed by oxidation after crystallization is completed.

The characteristic of above mentioned second subject of the present invention will be illustrated by FIG. 7 along with the scheme to improve the crystallinity of amorphous fine pore wall using a template composed of said carbon material.

In FIG. 7, (A) shows pores with amorphous wall. (B) shows the resulting state of the pores with amorphous wall filled with carbon obtained by following steps which comprises (1) introducing carbon precursor into the pores with amorphous wall and (2) passing carbonizing mean, for example, dry distillation to carbonize the carbon precursor. (C) shows the resulting state of the pores with crystalline wall filled with carbon obtained by following steps which comprises (1) passing the pores with amorphous wall filled with carbon in heat treatment process and (2) crystallizing the amorphous wall filled with carbon under no oxygen existing atmosphere to prevent the oxidation of said carbon. (D) shows the resulting state of the pores with crystalline wall obtained by following step which comprise removing the carbon in the pores with crystalline wall by oxidation. As clearly understood from the fact mentioned above, carbon the pores displays the function to maintain the form of fine pores at the crystallization by heat treatment.

The process composed of said (A) and (B) can be specifically illustrated by following 1-3.

1. Vapor of furfuryl alcohol is flown to crystallization precursor and is deposited furfuryl alcohol at least within the fine pores, and said deposited furfuryl alcohol is polymerized by heating or by acid catalyst such as solid acid or paratoluene sulfonic acid, and then cokes the polymerized furfuryl alcohol to form the filling template composed of carbon.

2. Using the organic compound such as saccharose or D(+)-glucose as carbon precursor which can be decomposed to carbon by dehydration function of conc. sulfuric acid, and prepare the diluted sulfuric acid solution of these compounds. The solution prepared above is mixed with the precursor of mesoporous substance at room temperature and is filled the carbon precursor at least within the fine pores, and then heats the mesoporous substance filled with the solution to concentrate the diluted sulfuric acid to be conc. sulfuric acid in an oven which is heated to 100, and the carbon precursor is partially carbonized by dehydration function of conc. sulfuric acid. After that, if necessary, the temperature is elevated to 160° C. and dried up. By repeating these treatments, a filling template composed of carbon is formed at least within the fine pores.

3. Vapor of hydrocarbon is flown to the precursor of mesoporous substance while the hydrocarbon is pyrolysized, and accumulate carbon at least within the fine pores.

In any case, the removing of carbon existing within the fine pores after the crystallization of the pore wall is carried out by heating under the presence of air by means of electric furnace. In this case, carbon is removed as $CO_2$. [FIG. 7, (C) and (D)].

D. Case which Uses Silica as a Filling Template

Precursor of mesoporous oxide and tetraethylorthosilicate (TEOS) or sodium silicate solution are mixed at room temperature, fill the solution prepared above at least within the fine pores, then gelficated at 80° C.-100° C. And the pore wall of the precursor of mesoporous oxide is crystallized by calcination by means of electric furnace under the air atmosphere. After that, by removing silica by alkaline washing, mesoporous oxide whose crystallinity is improved can be formed.

E. Case which Uses $BaCl_2$ or NaCl as a Filling Template

Precursor of mesoporous oxide and saturated aqueous solution of $BaCl_2$ or NaCl are mixed at room temperature, fill the solution prepared above at least within the fine pores, then evaporated to dryness and forms filling template of $BaCl_2$ or NaCl. Then crystallized under the atmosphere in which oxygen is exists, for example, by calcination by means of electric furnace under the air atmosphere. Then filling template of $BaCl_2$ or NaCl is removed by washing with water.

F. As a precursor of mesoporous substance, the precursors, which are formed by known method, can be used, however, the precursors obtained by the method for preparation of mesoporous substance consisting of transition metal oxide developed by the inventors of the present invention can be mentioned as the desirable one.

As the method for preparation of the precursor of said mesoporous substance, following method can be mentioned, that is, to the solution prepared by dissolving polymer surfactant in organic solvent, transition metal salt and/or metal alkoxide which is the precursor of transition metal oxide is added and dissolved, so that prepare sol solution in which said transition metal salt and/or metal alkoxide is hydrolyzed, polymerized and self assembled to obtain gel whose framework is stabilized from said sol solution, and calcinating said gel in the atmosphere in which oxygen exists at 350° C.-550° C., especially, the method comprising, preparing the mixture for sol solution formation by blending 0.003 mol-0.01 mol of $TaCl_5$, $NbCl_5$, mixture of these compounds or Al propoxide to the solution consisting of 10 g of aliphatic normal chain alcohol and 1 g of template compound, forming sol solution by adding 5-35 mol to said metal compound of water or aqueous solution of inorganic salt to said mixture, by hydrolyzing and polycondensazing, transporting said sol to the atmosphere in which oxygen is existing and forming gel by maturing at the temperature of 40° C.-100° C., then calcinating said gel in the atmosphere in which oxygen is existing at 350° C.-550° C. can be mentioned.

Meso porous substance of transition metal oxide can be prepared by using at least one selected from the group consisting of chloride of La, Ta, Nb, Ti, Zr, Mg or Al and alkoxide as a precursor.

G. As the material for template used for the preparation of mesoporous substance, any kinds of conventional detergent can be used, however, the use of nonionic surfactant consisting of block copolymer composed of polyethyleneoxide chain $(CH_2CH_2O)_m$ and polypropyleneoxide chain $[CH_2CH(CH_3)O]_m$ (wherein, m and n is 10-70, and ends of polymer are etherized by alcohol or phenol), for example, commodity name; P123 (product of BASF) and commodity name; P85, P103 $[HO(CH_2CH_2O)_{56}(CH_2CH(CH_3)O)_{17}(CH_2CH_2O)_{56})H]$ (product of Asahi Denka Industries) is desirable from the view point of formation desirable self assembled sol and formation of stable gel from said sol. As the useful organic solvent for the formation of said sol aliphatic alcohol can be mentioned, and specifically, methanol, butanol, propanol, hexanol or the mixture of them can be mentioned as the desirable organic solvent.

H. The characteristics of the obtained mesoporous oxide are measured according to the following methods.

1. XDR (product of Rigaku Co., Ltd., RINT 2100, CuK α ray) method: By lower angle (1-6°) peak pattern, periodic structure of fine meso pores can be observed.

2. Nitrogen absorption isothermal curve (SA3100 product of Coulter Co., Ltd.): Relative pressure ($P/P_0$) (X axis) range, where nitrogen absorption (Y axis/volume (mL/g)) steeply increases, corresponds with the length (diameter) of fine pore. The degree of rising relates to fine pore volume.

3. TEM: Transmission electron microscope (JEM 2010F, product of JEOL Co., Ltd., accelerating voltage is 200 kv): TEM image of hexagonal array structure of mesoporous NbTa oxide is observed.

4. Electron beam diffraction image (JEM 2010F, product of JEOL Co., Ltd., accelerating voltage is 200 kv): The hexagonal array structure of fine pores is observed from the image which 6 spots are orderly arrayed with even interval surrounding one spot vertically to fine pore.

EXAMPLE

The present invention will be illustrated more specifically according to the Examples, however, not intending to limit the scope of claims of the present invention.

Example 1

1 g of P123 [Trade name, product of BASF Co., Ltd., $(HO(CH_2CH_2O)_{20}(CH_2CH(CH_3O)_{70}(CH_2CH_2O)_{20})H)$ was placed in beaker, 10 g of ethanol (product of Kanto Kagaku) was added and dissolved said surfactant by stirring. 0.03 mol-0.01 mol of mixture of niobium chloride ($NbCl_5$) and tantalum chloride ($TaCl_5$) (corresponding to abscissa of FIG. 1) is added and stirred for dissolving for 20 minutes. Then 0.32 g-6.00 g of water was added for hydrolysis (corresponding to ordinate of FIG. 1, 0.018 mol-0.333 mol) and stirred for another 10 minutes. Transparent sol solution obtained was transported to a laboratory dish, and maturated in an oven kept at 40° C.-80° C., for 3-7 days in air and formed gel. Then the transparent gel obtained was baked in an electric furnace in air atmosphere at 400° C.-550° C. for 5 hours, and the surfactant (P123) which is the template component of fine pore structure was removed. And amorphous mesoporous NbTa oxide or mesoporous NbTa oxide with periodic fine pores of hexagonal structure, which is the first subject of the present invention, was synthesized. The crystallinity state of the mesoporous NbTa oxide was varied according to the blending amount of mixture of niobium chloride ($NbCl_5$) and tantalum chloride ($Ta Cl_5$) and amount of water to be added. Results are shown in FIG. 1. In FIG. 1, ○ mark indicates the case when mesoporous NbTa oxide of hexagonal array structure which is the first invention of the first subject of the present invention present invention is synthesized, ▲ mark indicates the case when the lower periodic fine pore structure is formed and x mark indicates the case when the random fine pore structure is formed.

Figure 2:
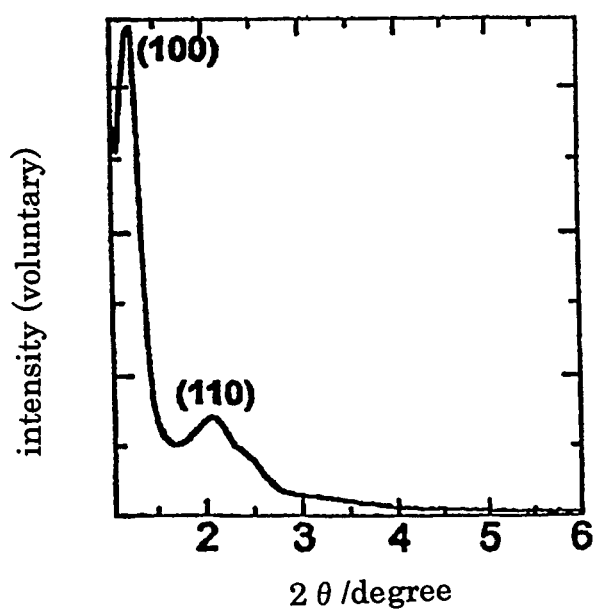
FIG. 2 shows XRD of mesoporous NbTa oxide of the present invention obtained in Example 1 whose pore structure periodicity is hexagonal packed structure. ○ mark indicates the case when mesoporous NbTa oxide of hexagonal sequence structure of the present invention is synthesized, ▲ mark indicates the case when the fine pore structure of lower structure period is formed and x mark indicates the case when the random fine pore structure is formed.

The characteristics of XDR is shown in FIG. 2. From FIG. 2, the presence of hexagonal array structure can be conjectured.

Figure 3:
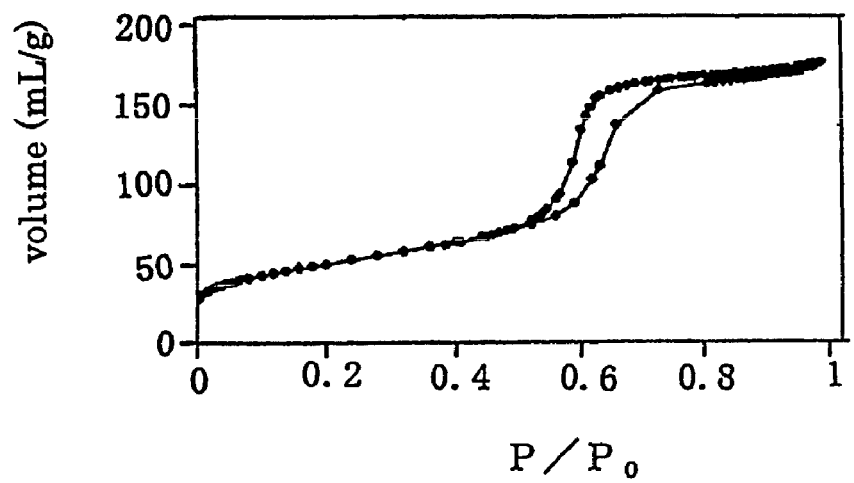
FIG. 3 shows nitrogen adsorption isotherm of mesoporous NbTa oxide of the present invention obtained in Example 1 whose pore structure period is hexagonal packed structure. The nitrogen adsorption isotherm rises steeply at P/Po=0.55 around, becomes flat closely at P/Po=0.60, and observed that BET surface area is 184 $m^2/g$, fine pore size is 5.6 nm and fine pore volume is 0.34 mL/g.

In FIG. 3, the nitrogen adsorption isotherm curve of the mesoporous oxide of the invention of the first subject of the present invention obtained according to the method shown in FIG. 1 by blending 0.005 mol of metal supplying source and 0.018 mol of water is shown. From the result that the nitrogen adsorption isotherm curve steeply ascends at $P/Po=0.5$ around and becomes flat at over than $P/Po=0.60$ around, it is observed that the BET surface area is 184 $m^2/g$, fine pore size is 5.6 nm and volume of fine pore is 0.34 mL/g.

Example 2

Figure 4:
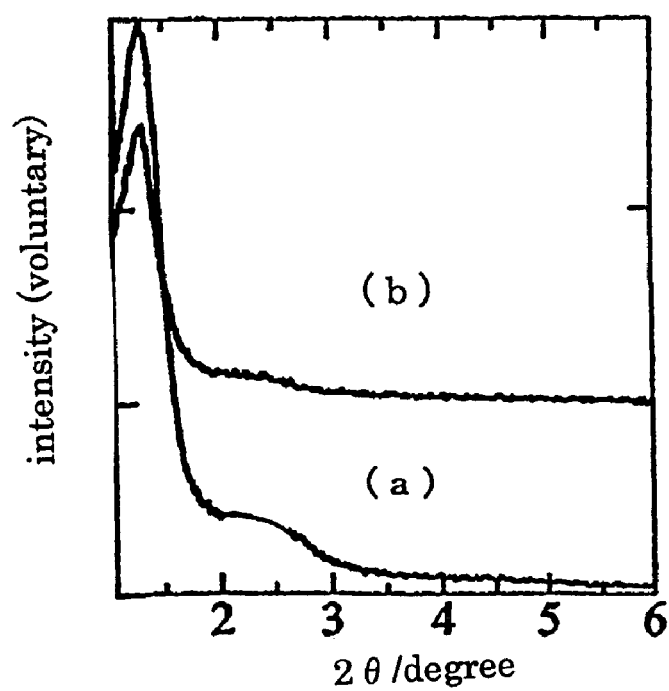
FIG. 4 shows XRD mesoporous Nb oxide of the present invention whose pore structure periodicity is hexagonal packed structure obtained in the case (a) when Nb of Example 2 is 0.008 mol and water is 0.056 mol (1 g). At the high angle side of d(100), d(110) peak can be more clearly confirmed, and indicates that periodicity of fine pores improved compared with the case to which water is not added (b).

By same procedure as set forth in Example 1, but using niobium chloride ($NbCl_5$) alone instead of the mixture of niobium chloride ($NbCl_5$) and tantalum chloride ($TaCl_5$), the mesoporous oxide was synthesized. XRD pattern of obtained mesoporous oxide is shown in FIG. 4.

It becomes clear that in the case when 0.008 mol of Nb and 0.056 mol (1 g) of water are blended (a), d (110) peak can be observed more clearly at the higher angle side of d (100), and the regularity of fine pores improved compared with the case that water is not added (b).

Further, from the nitrogen adsorption isotherm curve of the mesoporous oxide of the present invention (not shown), it is observed that the BET surface area is 211 m²/g, fine pore size is 4.8 nm and volume of fine pore is 0.40 mL/g.

Example 3

Figure 5:
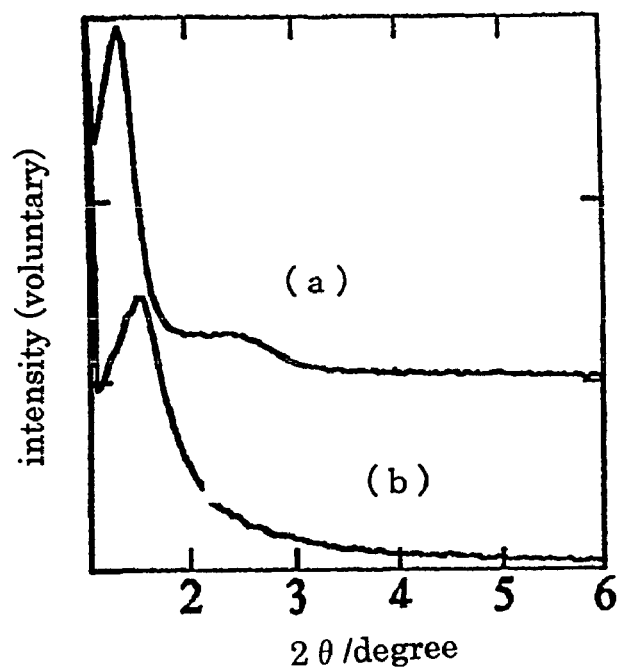
FIG. 5 shows XRD mesoporous Ta oxide of the present invention whose pore structure period is hexagonal packed structure obtained in the case (a) when Ta of Example 3 is 0.006 mol and water is 0.32 g and in the case (b) when water is not added.

By same procedure as set forth in Example 1, but using niobium chloride (TaCl₅) alone instead of the mixture of niobium chloride (NbCl₅) and tantalum chloride (TaCl₅), the mesoporous oxide was synthesized. X ray diffraction image of obtained mesoporous oxide is shown in FIG. 5.

It becomes clear that in the case when 0.006 mol of Ta and 0.32 g of water are blended (a), d (110) peak can be observed more clearly at the higher angle side of d (100), and the regularity of fine pores improved compared with the case that water is not added (b).

From said results, it is understood that the compound having regular fine pores array was synthesized.

Further, from the nitrogen adsorption isotherm curve of the mesoporous oxide of the present invention (not shown), it is observed that the BET surface area is 134 m²/g, fine pore size is 4.9 nm and volume of fine pore is 0.26 mL/g.

Example 4

Figure 6:
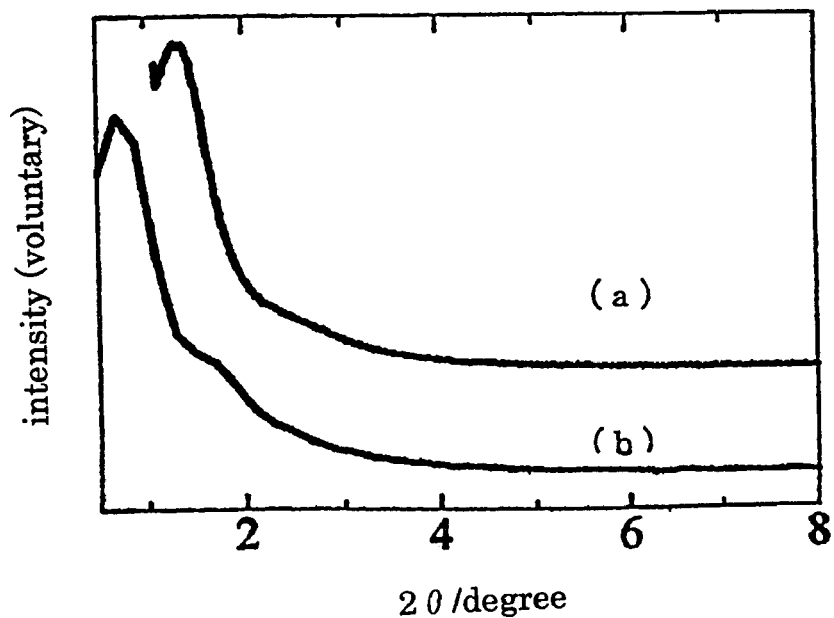
FIG. 6 shows XRD mesoporous Al oxide of the present invention whose pore structure periodicity is hexagonal packed structure obtained in the case (a) when 1.8 g of water is added and in the case (b) when water is not added.

Aluminum isopropoxide was used as the metal supplying source, n-propanol was used as normal alcohol, 37% aqueous solution of hydrochloric acid was added as gelling catalyst, 5-20 times mol of water to metal supplying source was added, initial maturation was carried out in air at 40° C., further maturation (2 steps maturation) was carried out for the purpose to progress the sufficient gelation at the temperature range of 60° C.-100° C. for 7-10 days. The calcination process after gelation was same as to Example 1. X-ray diffraction images of case (a) when 1.8 g of water was added and (b) when water was not added are shown in FIG. 6. From the result that the nitrogen adsorption isotherm curve radically ascends at P/Po=0.63 around and becomes flat at over than P/Po=0.8 around, it is observed that the BET surface area is 340 m²/g, fine pore size is 10 nm and volume of fine pore is 1.1 mL/g.

Example 5

Crystallization of (NbTa)₂O₅, which is Mesoporous NbTa Oxide 1 g of P123 [Trade name, product of BASF Co., Ltd., (HO(CH₂CH₂O)₂₀(CH₂CH(CH₃)O)₇₀(CH₂CH₂O)₂₀)H) was placed in a beaker, 10 g of ethanol (product of Kanto Kagaku) was added and dissolved said surfactant by stirring. 0.03 mol-0.01 mol of mixture of niobium chloride (NbCl₅) and tantalum chloride (TaCl₅) (corresponding to abscissa of FIG. 1) is added and stirred for dissolving for 20 minutes. Then 0.32 g-6.00 g of water was added aiming hydrolysis (0.018 mol-0.333 mol) and stirred another 10 minutes. Obtained transparent sol solution was transported to a laboratory dish, and maturated in an oven kept at 40° C.-80° C., for 3-7 days in air and form gel. Then the obtained transparent gel was baked in an electric furnace in air atmosphere at 400° C.-550° C. for 5 hours, and the detergent (P123) which is the template component of fine pore structure was removed and white NbTa oxide having controlled fine pore structure according to the blending amount of mixture of niobium chloride (NbCl₅) and tantalum chloride (TaCl₅) and amount of water to be added.

The white NbTa oxide obtained having above mentioned fine pore structure was used as a precursor of mesoporous substance, and carried out following crystallization heat treatment of the pore wall.

Figure 8:
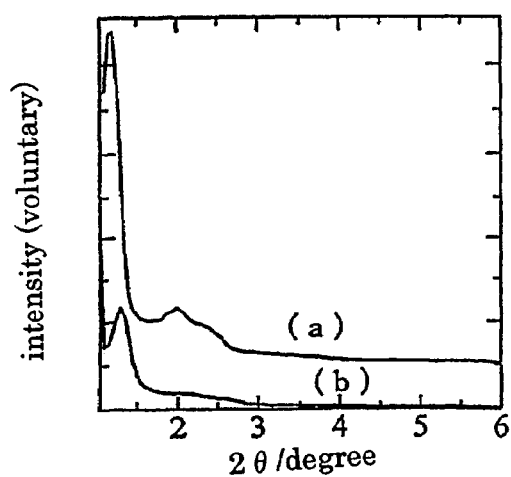
FIG. 8 shows the low angle X ray diffraction pattern of crystalline mesoporous NbTa oxide of Example 5. (a) shows the state before crystallization and (b) shows the state of crystallization using carbon template after carbon is removed.

Crystallization heat treatment; Vapor of furfuryl alcohol of 200° C. was supplied to said precursor of mesoporous substance for 3 hours using nitrogen gas as a carrier gas. By polymerization of furfuryl alcohol, polymer was accumulated and filled up in fine pores. Then, the polymer was decomposed (dry distilled) by heat treatment at 400° C.-600° C. in non oxygen existing condition. On this step, the crystallization was not progressed. Then, by the heat treatment at 650° C. for 1-10 hours, under no oxygen existing condition to prevent the removal of carbon filled within pores of the mesoporous substance as template, crystallization of amorphous pore wall was progressed. After that, by calcination in air, carbon was removed, the crystalline mesoporous NbTa oxide having crystalline structure of atomic order was obtained. Low XRD and high angle XRD of said NbTa oxide are respectively shown in FIG. 8 and FIG. 9. In FIG. 8, (a) indicates before crystallization and (b) indicates after removal of carbon after crystallization using carbon template. From FIG. 9, the characteristic of improvement of crystallization of fine pore wall can be understood.

Figure 10:
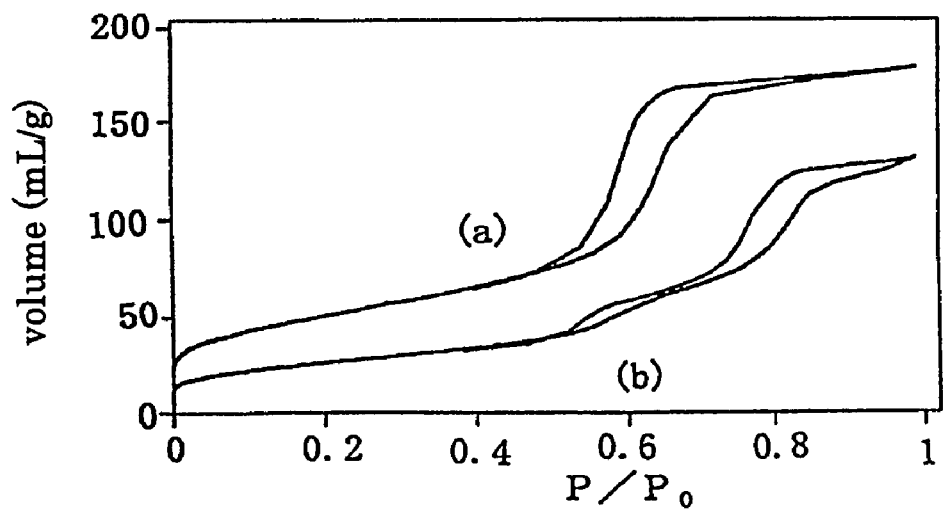
FIG. 10 shows the nitrogen adsorption isotherm of crystalline mesoporous NbTa nitrate of Example 5. (a) shows the state before crystallization and (b) shows the state of crystallization using carbon template after carbon is removed.

And, relative pressure (P/P₀) (X axis) range where nitrogen absorption (volume/g, mL/g) of Y axis of nitrogen adsorption isotherm curve of before crystallization (a) and after removal of carbon after crystallization using carbon template (b) of FIG. 10 is increasing and fine pore size is corresponded, and the degree of rising is related with fine pore volume, consequently, it is confirmed that the opening of fine pores and empty pore of fine pore is maintained without crushing after crystallization heat treatment.

Figure 9:
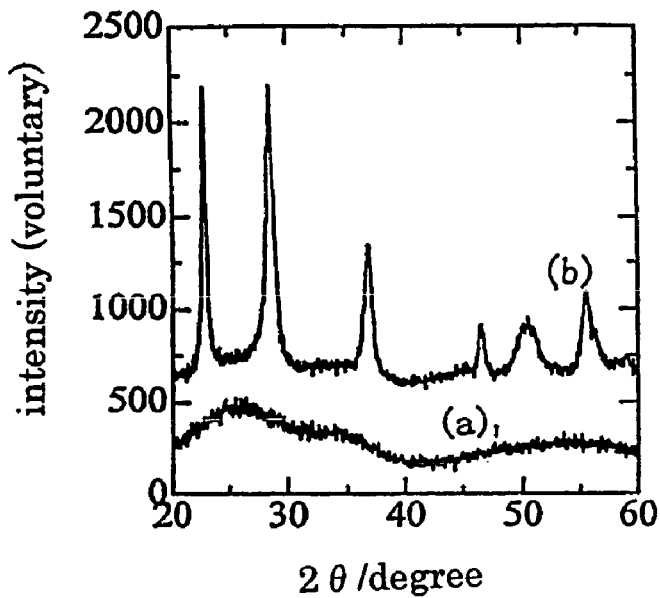
FIG. 9 shows the high angle X ray diffraction pattern of crystalline mesoporous NbTa oxide of Example 5. (a) shows the state before crystallization and (b) shows the state of crystallization using carbon template after carbon is removed.

In this connection, in the case which filling template composed of carbon is not existing, the features of FIGS. 8 and 9 are not observed.

From the observation of TEM (conventional transmission electron microscope image), an electron beam diffraction pattern which shows that the particles are crystallized and a lattice pattern which shows the crystallization of fine pore wall are observed, consequently, it is confirmed that the hexagonal structure at the opening of fine pores and that the periodicity of fine pores is maintained.

Example 6

Crystallization Treatment of Mesoporous MgTa Oxide

Mixture of magnesium chloride and tantalum chloride was used as the metal supplying source, and a precursor of mesoporous substance was prepared by same process to Example 5. The blending ratio of metal supplying source MgCl₂ and TaCl₅ was Mg:Ta=1:2.

The crystallization was carried out by same process to Example 5. In the meanwhile, as the calcination condition, calcinating by 850° C. under no oxygen existing for 1 hour was used.

Figure 11:
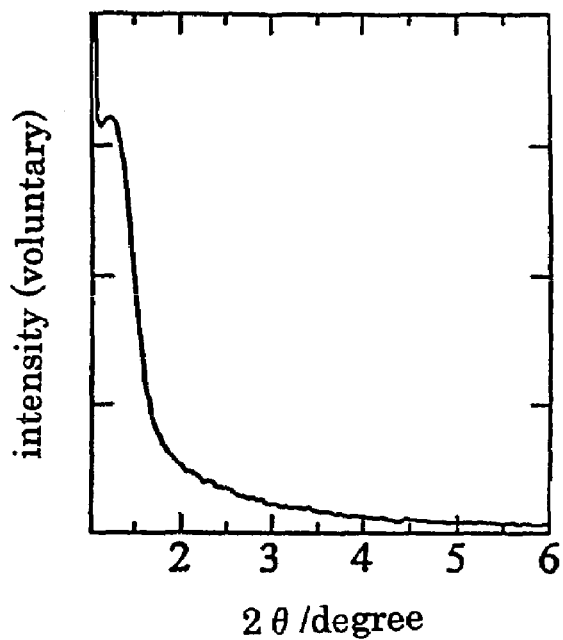
FIG. 11 shows the low angle X ray diffraction pattern of crystalline mesoporous MgTa oxide after crystallized using carbon template of Example 6.
Figure 12:
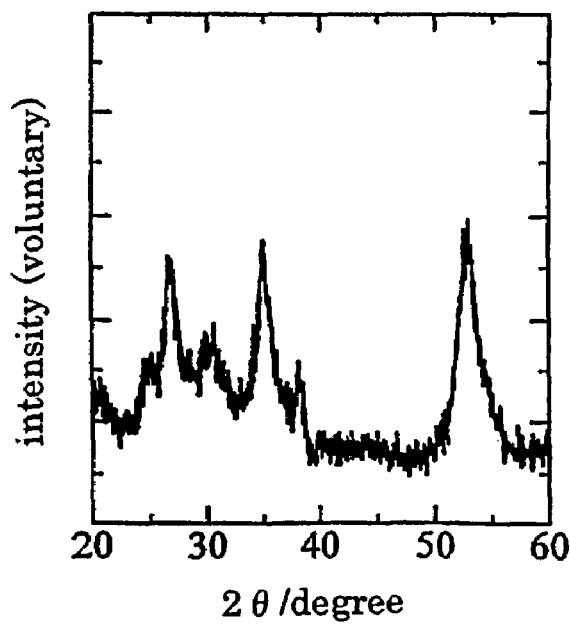
FIG. 12 shows the high angle X ray diffraction pattern of crystalline mesoporous MgTa oxide after crystallized using carbon template of Example 6.
Figure 13:
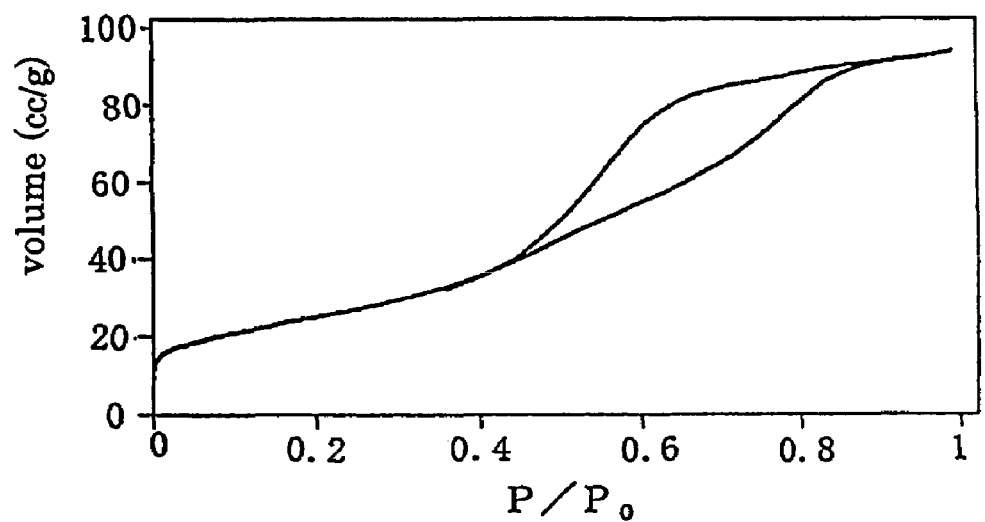
FIG. 13 shows the nitrogen adsorption isotherm of crystalline mesoporous MgTa oxide after crystallized using carbon template of Example 6.

Same as to Example 5, from the low angle pattern, high angle pattern of FIGS. 11-13 and nitrogen adsorption isotherm curve, although the peculiarity is not so strong compared with that of Example 5, the maintenance of fine pores and maintenance of structure and periodicity can be confirmed.

Example 7

Crystallization of Mesoporous Anatase Class TiO$_2$ Oxide

As the nonionic surfactant, P85 (Trade name, product of Asahi Denka Industries: HO(CH$_2$CH$_2$O)$_{39}$(CH$_2$CH(CH$_3$O)$_{26}$(CH$_2$CH$_2$O)$_{39}$)H] was dissolved by stirring in propanol, which is normal alcohol, then titanium tetraisopropoxide was introduced as the metal supplying source. 37% hydrochloric acid was added as a catalyst for reaction and transparent sol solution was obtained. After that, maturated, and template was removed by calcination, thus the precursor of meso porous substance was obtained.

Figure 14:
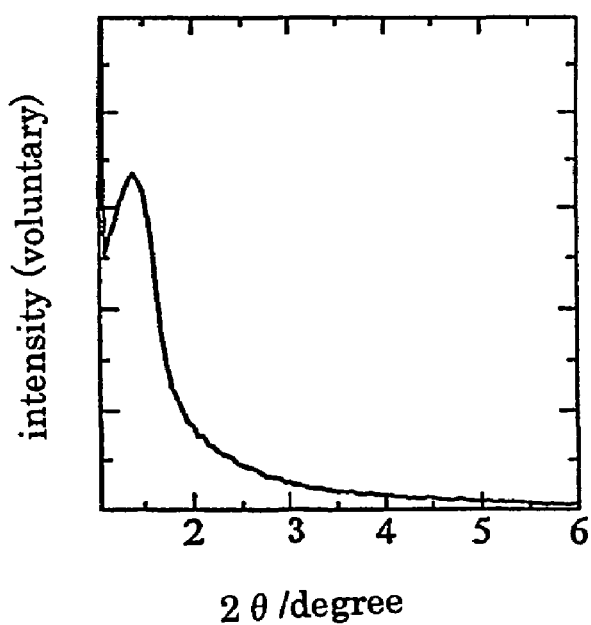
FIG. 14 shows the low angle X ray diffraction pattern of crystalline mesoporous anatase $TiO_2$ oxide after crystallized using carbon template of Example 7.
Figure 15:
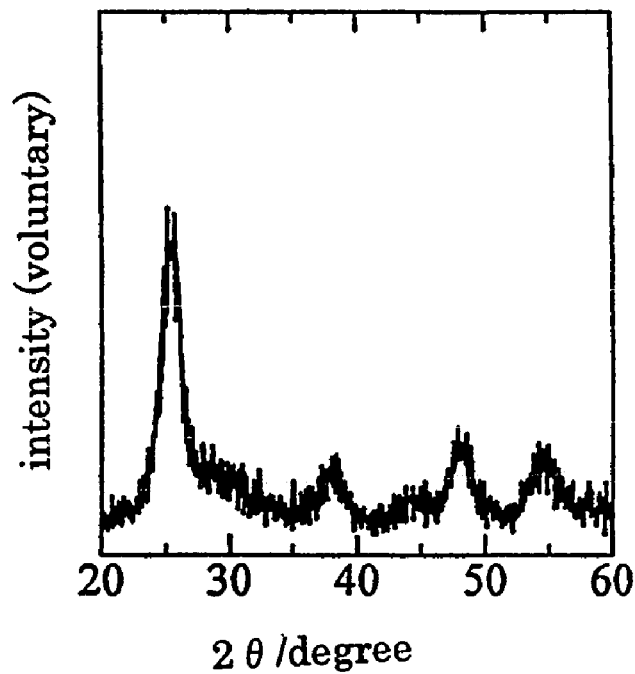
FIG. 15 shows the high angle X ray diffraction pattern of crystalline mesoporous anatase $TiO_2$ oxide after crystallized using carbon template of Example 7.
Figure 16:
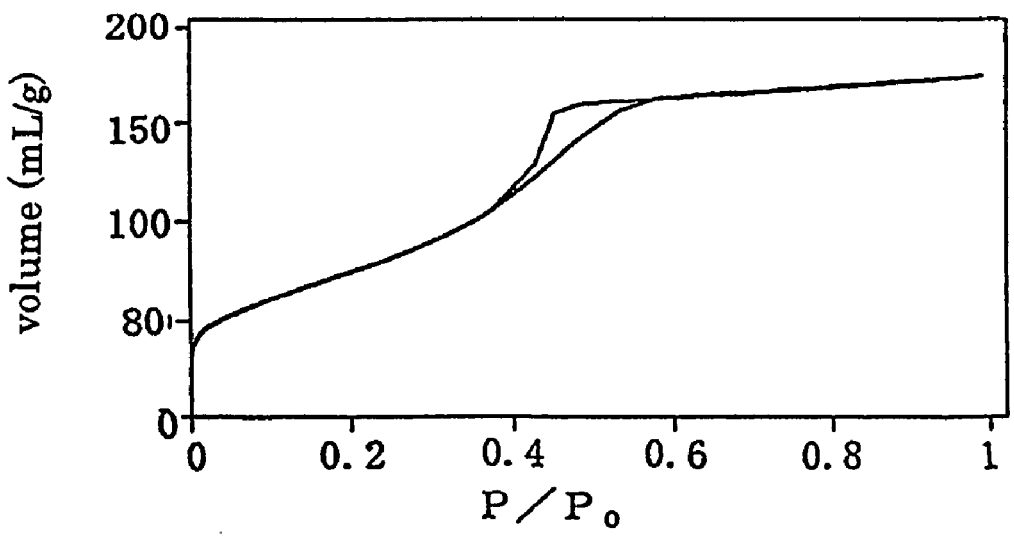
FIG. 16 shows the nitrogen adsorption isotherm of crystalline mesoporous anatase $TiO_2$ oxide after crystallized using carbon template of Example 7.

Crystallization was carried out by same process to Example 5. As the condition for crystallization, relatively mild condition, specifically, at 400° C. under non oxygen existing, for 10 hours was applied. Removal of carbon was carried out in air at 350° C. for 15 hours. Same as to Example 5, from the low angle pattern, high angle pattern of FIGS. 14-16 and nitrogen adsorption isotherm curve, although the peculiarity is not so strong compared with that of Example 5, the maintenance of fine pores and maintenance of structure and periodicity can be confirmed.

INDUSTRIAL APPLICABILITY

As mentioned above, it is obvious for the invention of the first subject to contribute to the progress of industries, because the non-silica mesoporous oxide provided by the invention has charactristics that the structure of fine pores and periodicity of it are uniform and stable, and said uniform structure of fine pore can contribute to stability of the mesoporous material which is used in various fields. Further, since the method for preparation of said non-silica mesoporous oxide bases on sol-gel method, but setting of parameter for preparation of said non-silica mesoporous oxide is comparatively easy in spite of that the conditions for producing said non-silica mesoporous oxide are precise, from that point of view the invention also contribute to the progress of industries.

Still further, it become possible to obtain mesoporous oxide with high crystallinity fine pore wall, which is conventionally difficult to obtain, by filling a filling template within fine pores, and carrying out heat treatment of crystallization of pore wall maintaining fine pore opening, periodicity of fine pores and fine empty structure which is the first subject of the invention, and is obvious that the present invention contribute to the improvement of meso porosity substance technique.

The invention claimed is:

1. A method for preparation of mesoporous oxide composed of non-silica mesoporous oxide whose fine pore structure periodicity is hexagonal array structure, average maximum length of fine pores is from 2 nm to 50 nm and the wall which forms said fine pores is composed of non-silica oxide selected from the group consisting of Ta oxide, Nb oxide, mixed oxide of Ta and Nb and Al oxide comprising; preparing a mixture for forming sol solution by blending 0.003 mol-0.01 mol of either TaCl$_5$, NbCl$_5$, a mixture of TaCl$_5$ and NbCl$_5$, or Al isopropoxide into a solution composed of 10 g of aliphatic normal alcohol and 1 g of template compound, adding water or an aqueous solution of inorganic acid in an amount that is 5-35 times the mol concentration of the metal compound present in the mixture, hydrolyzing and polycondensing to form sol solution, transporting said sol to the environment where oxygen is existing to form gel by maturing at 40° C.-100° C. and calcinating said gel in the environment where oxygen is existing at 350° C.-550° C.

2. The method for preparation of mesoporous oxide of claim 1, wherein the template compound is nonionic surfactant consisting of block copolymer composed of polyethyleneoxide chain (CH$_2$CH$_2$O)$_m$ and polypropyleneoxide chain [CH$_2$CH(CH$_3$)O]$_n$, wherein, m and n is 10-70, end of said block copolymer is etherificated by H, alcohol or phenol, wherein, alcohol is methanol, butanol, propanol, hexanol or mixture of 2 or more of these alcohols.

3. A method for preparation of mesoporous oxide whose crystallinity is improved comprising;

forming a filling template at least within fine pores of precursor of the mesoporous oxide, wherein said filling template can maintain the shape of the fine pores during the heat treatment process of crystallization of fine pore wall and said filling template can be removed by calcination or by washing with water to which acid or base is added, carrying out the heat treatment of crystallization of the pore wall under the presence of said filling served as template within the fine pores, and then removing said template by calcinating or by washing with water or water to which acid or base is added wherein the precursor of mesoporous oxide is obtained by adding and dissolving metal salt and/or metal alkoxide of transition metal which is the precursor of transition metal oxide into the solution prepared by dissolving polymer surfactant in organic solvent, hydrolyzing and polymerizing said salt and/or metal alkoxide of transition metal to form self-assembled sol solution, obtaining stabilized gel from said sol solution by transporting said sol to an environment where oxygen is existing to form gel by maturing at 40° C.-100° C. and calcinating said gel in the atmosphere where oxygen is existing at 350° C.-550° C., and heat treatment of crystallization of the pore wall of the precursor of mesoporous oxide is carrying out at higher temperature than carbonizing temperature under inert atmosphere where oxygen is not existing.

4. A method for preparation of mesoporous oxide whose crystallinity is improved comprising;

forming a filling template at least within fine pores of precursor of the mesoporous oxide, wherein said filling template can maintain the shape of the fine pores during the heat treatment process of crystallization of fine pore wall and said filling template can be removed by calcination or by washing with water to which acid or base is added, carrying out the heat treatment of crystallization of the pore wall under the presence of said filling served as template within the fine pores, and then removing said template by calcinating or by washing with water or water to which acid or base is added wherein the method to form the filling template at least within fine pores of precursor of the mesoporous oxide contains (1) the process step of forming an organic compound which can be partially or fully carbonized within the fine pores, and (2) the process step of forming the filling template having partially or fully carbonized substance within the fine pores by partial-oxidizing decomposition or partial or full carbonization of the organic compound wherein the precursor of mesoporous oxide is obtained by adding and dissolving metal salt and/or metal alkoxide of transition metal which is the precursor of transition metal oxide into the solution prepared by dissolving polymer surfactant in organic solvent, hydrolyzing and polymerizing said salt and/or metal alkoxide of transition metal to form self-assembled sol solution, obtaining stabilized gel from said sol solution by transporting said sol to an environment where oxygen is existing to form gel by maturing at 40° C.-100° C. and calcinating said gel in the atmosphere where oxygen is existing at 350° C.-550° C., further comprising the step of performing crystallizing heat treatment of the pore wall of the precursor of mesoporous oxide at a higher temperature than the carbonizing temperature under an inert atmosphere where oxygen is not existing.

5. A method for preparation of mesoporous oxide whose crystallinity is improved comprising;

forming a filling template at least within fine pores of precursor of the mesoporous oxide, wherein said filling template can maintain the shape of the fine pores during the heat treatment process of crystallization of fine pore wall and said filling template can be removed by calcination or by washing with water to which acid or base is added, carrying out the heat treatment of crystallization of the pore wall under the presence of said filling served as template within the fine pores, and then removing said template by calcinating or by washing with water or water to which acid or base is added wherein the method to form the filling template at least within fine pores of precursor of the mesoporous oxide contains (1) the process step of forming an organic compound which can be partially or fully carbonized within the fine pores, and (2) the process step of forming the filling template having partially or fully carbonized substance within the fine pores by partial-oxidizing decomposition or partial or full carbonization of the organic compound wherein the organic compound which can be partially or fully carbonized by carbonization for forming template within fine pores of mesoporous oxide is polymer of furfuryl alcohol, glucose, fructose or derivatives thereof, and carbonization treatment is heat decomposition treatment and/or dehydration treatment by concentrated sulfuric acid.

6. The method for preparation of mesoporous oxide of claim 5, wherein the precursor of mesoporous oxide is obtained by adding and dissolving salt and/or metal alkoxide of transition metal which is the precursor of transition metal oxide into the solution prepared by dissolving polymer surfactant in organic solvent, hydrolyzing and polymerizing said salt and/or metal alkoxide of transition metal to form self-assembled sol solution, obtaining stabilized gel from said sol solution by transporting said sol to an environment where oxygen is existing to form gel by maturing at 40° C.-100° C. and calcinating said gel in the atmosphere where oxygen is existing at 350° C.-550° C., further comprising the step of performing crystallizing heat treatment of the pore wall of the precursor of mesoporous oxide at a higher temperature than the carbonizing temperature under an inert atmosphere where oxygen is not existing.

7. A method for preparation of mesoporous oxide whose crystallinity is improved comprising;

forming a filling template at least within fine pores of precursor of the mesoporous oxide, wherein said filling template can maintain the shape of the fine pores during the heat treatment process of crystallization of fine pore wall and said filling template can be removed by calcination or by washing with water to which acid or base is added, carrying out the heat treatment of crystallization of the pore wall under the presence of said filling served as template within the fine pores, and then removing said template by calcinating or by washing with water or water to which acid or base is added wherein the method to form the filling template at least within fine pores of precursor of the mesoporous oxide contains the process to mix said precursor with tetraethylorthosilicate or sodium silicate solution at room temperature and to gelificate tetraethylorthosilicate or sodium silicate solution at 80-100° C. after filled within fine pores.

8. The method for preparation of mesoporous oxide of claim 7, wherein the precursor of mesoporous oxide is obtained by adding and dissolving salt and/or metal alkoxide of transition metal which is the precursor of transition metal oxide into the solution prepared by dissolving polymer surfactant in organic solvent, hydrolyzing and polymerizing said salt and/or metal alkoxide of transition metal to form self-assembled sol solution, obtaining stabilized gel from said sol solution by transporting said sol to an environment where oxygen is existing to form gel by maturing at 40° C.-100° C. and calcinating said gel in the atmosphere where oxygen is existing at 350° C.-550° C., further comprising the step of performing crystallizing heat treatment of the pore wall of the precursor of mesoporous oxide at a higher temperature than the carbonizing temperature under an inert atmosphere where oxygen is not existing.

9. A method for preparation of mesoporous oxide whose crystallinity is improved comprising;

forming a filling template at least within fine pores of precursor of the mesoporous oxide, wherein said filling template can maintain the shape of the fine pores during the heat treatment process of crystallization of fine pore wall and said filling template can be removed by calcination or by washing with water to which acid or base is added, carrying out the heat treatment of crystallization of the pore wall under the presence of said filling served as template within the fine pores, and then removing said template by calcinating or by washing with water or water to which acid or base is added wherein the method to form the filling template at least within fine pores of precursor of the mesoporous oxide contains (1) the process to mix said precursor with saturated aqueous solution of $BaCl_2$ or NaCl at room temperature, filling saturated aqueous solution of $BaCl_2$ or NaCl into fine pores and (2) the process carrying out evaporation to dryness at 80° C.-100° C. to form filling template of $BaCl_2$ or NaCl in fine pores.

10. The method for preparation of mesoporous oxide of claim 9, wherein the precursor of mesoporous oxide is obtained by adding and dissolving salt and/or metal alkoxide of transition metal which is the precursor of transitiion metal oxide into the solution prepared by dissolving polymer surfactant in organic solvent, hydrolyzing and polymerizing said salt and/or metal alkoxide of transition metal to form self-assembled sol solution, obtaining stabilized gel from said sol solution by transporting said sol to an environment where oxygen is existing to form gel by maturing at 40° C.-100° C. and calcinating said gel in the atmosphere where oxygen is existing at 350° C.-550° C., further comprising the step of performing crystallizing heat treatment of the pore wall of the precursor of mesoporous oxide at a higher temperature than the carbonizing temperature under an inert atmosphere where oxygen is not existing.

* * * * *

UNITED STATES PATENT AND TRADEMARK OFFICE
CERTIFICATE OF CORRECTION

PATENT NO. : 7,326,398 B2  Page 1 of 1
APPLICATION NO. : 10/504429
DATED : February 5, 2008
INVENTOR(S) : Domen et al.

It is certified that error appears in the above-identified patent and that said Letters Patent is hereby corrected as shown below:

Title Pg, Item (54), and Col. 1, Line 2, should read:

--Non-Silica Mesoporous Oxide Having Improved Fine Pore Structure Periodicity, Method of Producing the Mesoporous Oxide and Method of Crystallizing Pore Wall of Non-Silica Mesoporous Oxide Using Template to Be Filled In Pores--

Title Page, Item (75), replace the first name of the third inventor "Tokumitsu" with --Tokumitu--.

Signed and Sealed this

Third Day of June, 2008

JON W. DUDAS
*Director of the United States Patent and Trademark Office*